Figure 10:
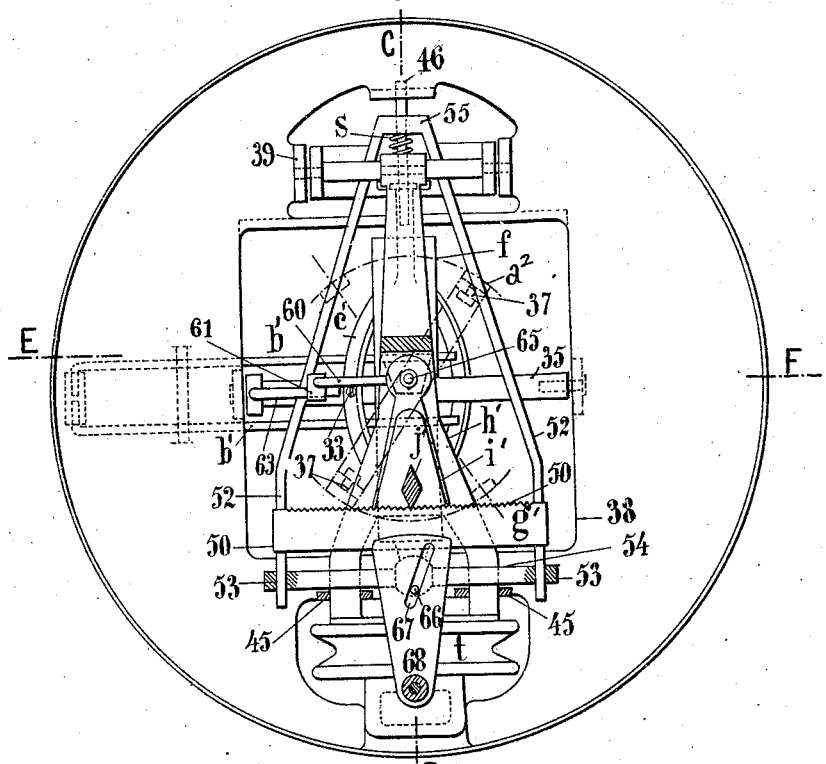

No. 844,259. PATENTED FEB. 12, 1907.
L. L. B. DENIS.
SPEED INDICATOR.
APPLICATION FILED SEPT. 20, 1904.
6 SHEETS—SHEET 1.
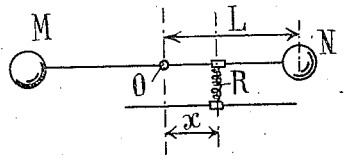
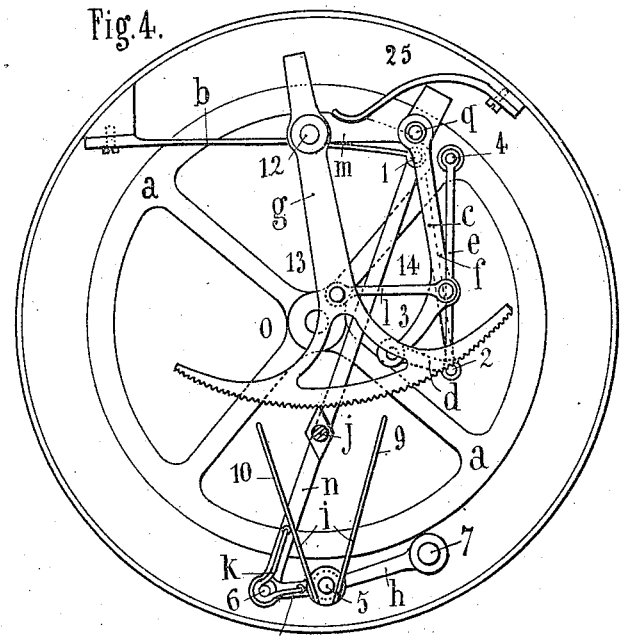
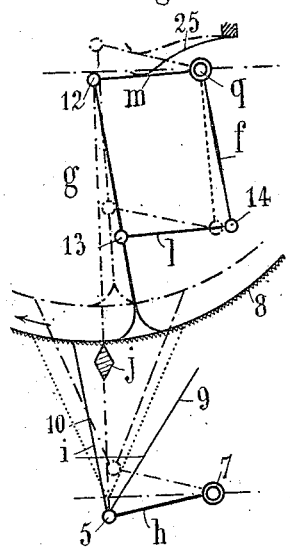
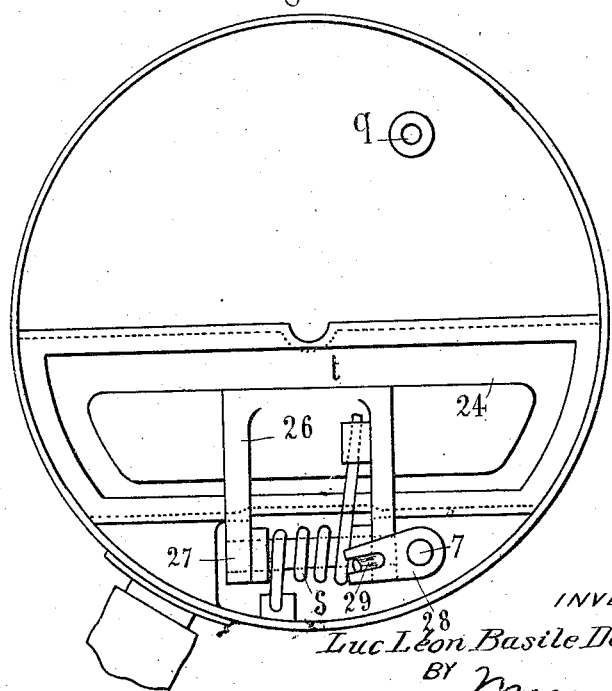
WITNESSES:
W. M. Avery
C. E. Holske
INVENTOR
Luc Leon Basile Denis
BY Munn & Co
ATTORNEYS No. 844,259. PATENTED FEB. 12, 1907.
L. L. B. DENIS.
SPEED INDICATOR.
APPLICATION FILED SEPT. 20, 1904.
6 SHEETS—SHEET 2.
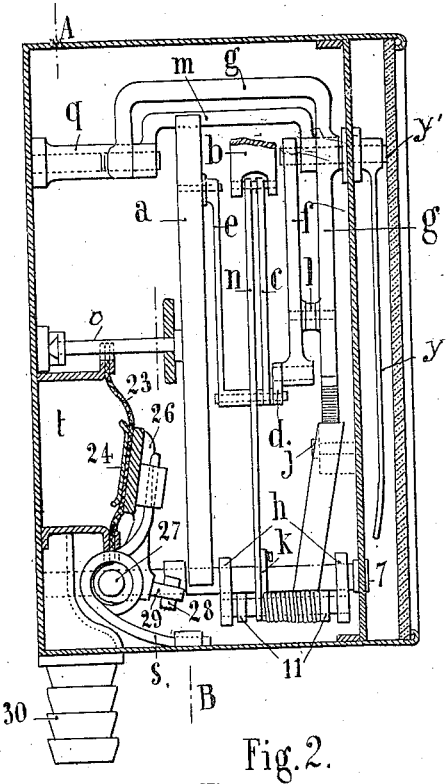
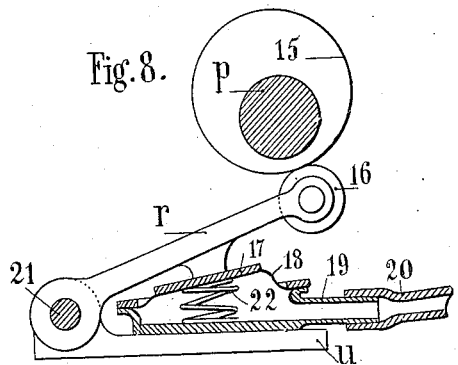
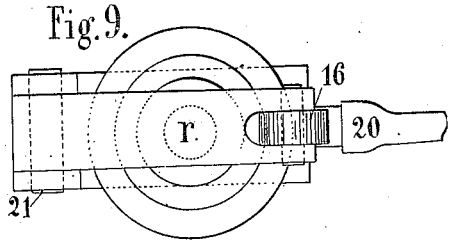
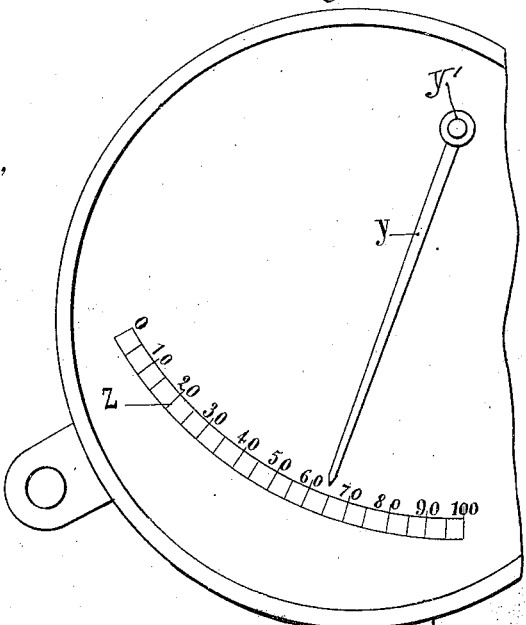
WITNESSES:
W. M. Avery
C. E. Holske
INVENTOR
Luc Léon Basile Denis
BY Munn & Co
ATTORNEYS No. 844,259. PATENTED FEB. 12, 1907.
L. L. B. DENIS.
SPEED INDICATOR.
APPLICATION FILED SEPT. 20, 1904.

6 SHEETS—SHEET 3.

WITNESSES:
W. M. Avery
C. E. Holske

INVENTOR
Luc Leon Basile Denis
BY Munn & Co
ATTORNEYS

No. 844,259.   
PATENTED FEB. 12, 1907.  
L. L. B. DENIS.  
SPEED INDICATOR.  
APPLICATION FILED SEPT. 20, 1904.  
6 SHEETS—SHEET 4.

WITNESSES  
W. M. Avery  
C. E. Holske

INVENTOR  
Luc Léon Basile Denis  
BY  
Munn & Co  
ATTORNEYS

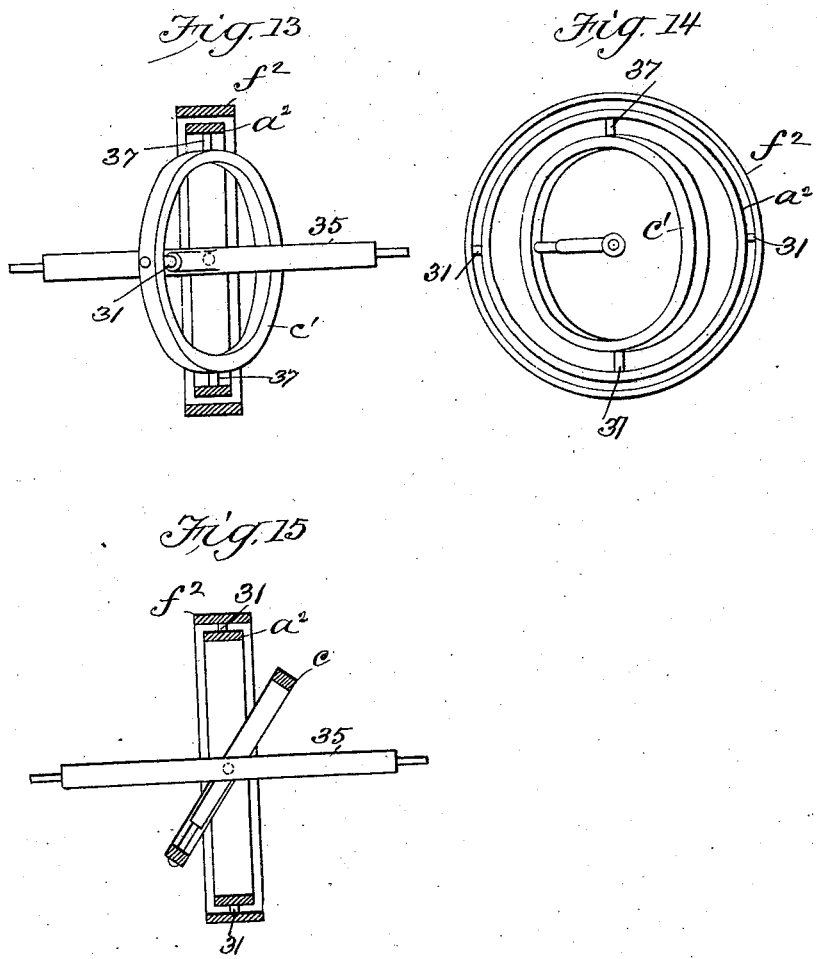

No. 844,259. PATENTED FEB. 12, 1907.
L. L. B. DENIS.
SPEED INDICATOR.
APPLICATION FILED SEPT. 20, 1904.
6 SHEETS—SHEET 6.
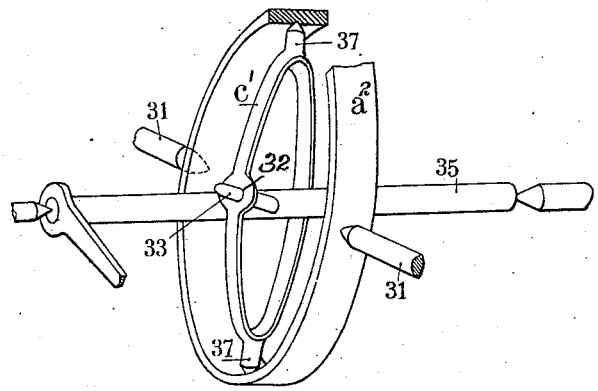
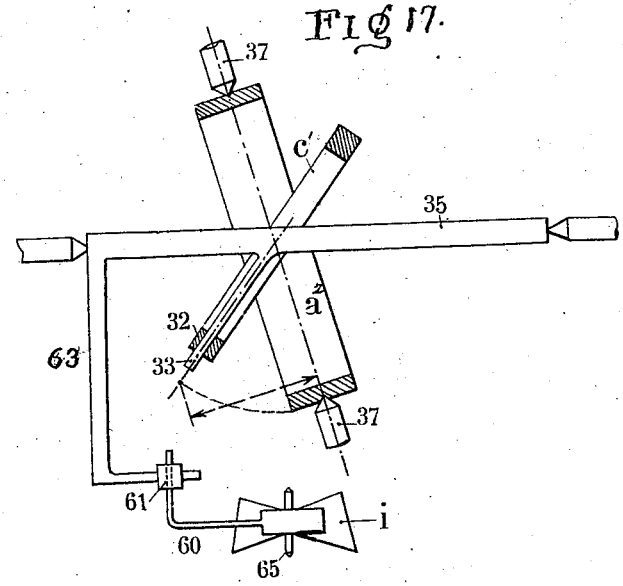

UNITED STATES PATENT OFFICE.

LUC LÉON BASILE DENIS, OF PARIS, FRANCE.

SPEED-INDICATOR.

No. 844,259.           Specification of Letters Patent.           Patented Feb. 12, 1907.

Application filed September 20, 1904. Serial No. 225,236.

*To all whom it may concern:*

Be it known that I, LUC LÉON BASILE DENIS, of 135 Boulevard Ménilmontans, in the city of Paris, Republic of France, engineer, have invented a Speed-Indicator, of which the following is a full, clear, and exact description.

This invention relates to a speed-indicating device which is so constructed as to be able to indicate even at a distance the speed of a part to which a rotary motion is imparted, such speed being expressed, according to the several applications, either by the number of turns per minute in the case of a machinery-shaft, or, for instance, in the case of a motor-car by the journey run by the rim of the wheel within a given unit of time, miles run in one hour, &c. This apparatus can also give the number of pulsations per minute made by a part having a reciprocating motion and operated by a crank.

The principle upon which this apparatus is based is as follows: It is well known that the reciprocating motion imparted from a crank-pin turning at a uniform speed to a slide having a rectilinear trajectory through a link of indefinite length or at least sufficiently long relatively to the stroke is the same as that of a beam oscillating freely under the influence of a spring. Suppose now a standard-beam whose number of pulsations per unit of time may be modified by the displacement of a part which will be called the "rectifier." During the working of the apparatus a comparison can be made between the rocking motion given by the shaft whose number of turns it is intended to ascertain and the one given by this beam. If the oscillations of the latter do not correspond with those given by the shaft, it results that in virtue of the non-concordance of pulsations successive displacements of the rectifier in the suitable direction for reëstablishing the concordance are caused to take place. The position of the rectifier will of course indicate the number of pulsations of the standard-beam, and accordingly the number of pulsations given by the shaft and which is the same. The apparatus therefore is self-controlling. In other words, there is an automatic resetting to unison. Besides the advantages of accuracy obtained with such a device and hereinafter mentioned those resulting from the distant transmission of motion in the form of pulsations being seen at once. These results can be obtained by means of an air-tube and of two drums or barrels provided with diaphragms. This transmission can also be obtained in spite of the relative unsteadiness of the indicator with reference to the shaft to be controlled. Thus, for instance, the motion of one of the front wheels of a motor-car will be transmitted to the apparatus arranged in front of the driver by a simple flexible tube of india-rubber or other similar material.

In order to be better understood, the apparatus which forms the subject-matter of the present application has been represented in the accompanying drawings, in which—

Figures 1, 2, and 3 are schematic views concerning the operation of the apparatus. Fig. 4 shows the mechanism in front view. Fig. 5 is a vertical section on line A B of Fig. 7. Fig. 6 is an external view of the dial. Fig. 7 is a cross-section of the apparatus. Figs. 8 and 9 show, respectively, a section and a plan view of the transmitting apparatus. Figs. 10 to 17 show a modification, Fig. 10 being a face view, Fig. 11 a vertical section on line C D of Fig. 10, Fig. 12 a longitudinal section on line E F of Fig. 10, and Figs. 13, 14, 15, 16, and 17 detail views of the rings and their connections with each other and with the shaft.

In these figures the same letters of reference denote the same parts.

For the sake of clearness this specification is divided into three parts: first, the standard-beam; second, the mechanism for the resetting into synchronism; third, the transmission from the shaft to be controlled to the apparatus.

*First. The beam.*—The beam or balance possesses some new features which allow of obtaining adequate figures for speeds varying between very broad limits. First, the number of pulsations given by the beam or balance is proportionate to the distances of the rectifier (or the part causing this number of pulsations to vary) at the beginning of the graduation; second, the powers producing an oscillation are always the same, whatever the duration of this oscillation may be, a circumstance which alone in experimental physics allows of obtaining adequate results on account of the constancy of errors. An oscillating balanced beam or balance (like the one of a watch, for instance) is essentially composed of two parts—a vibratory mass around its center of gravity and a spring arranged upon this mass and tending to bring the same again to a middle position. Suppose the system schematically shown in Fig. 1, in which two equal weights M and N are located at an equal distance from a center of oscillation O. If a spring R is placed upon one point of the bar connecting these two masses, the distance from the point of application to the center of oscillation being $x$; if we displace this spring so as to vary the distance $x$ between the same and the point O, the number of oscillations per minute which the beam or balance can make, under the influence of the spring, varies in proportion to the distances $x$. This theoretical desideratum has been almost obtained by means of the following practical arrangement represented apart in the schematic view of Fig. 2. $a$ is a fly-wheel forming the balance or beam and freely rotating about its center 0. $b$ is a leaf-spring connected at one of its ends to the body of the apparatus, forming a fixed point. The other end is hinged at 1 to the link $c$. This link $e$ is pivotally connected at 2 to another link of the same length as well as to a small link $d$. The other end of $e$ is hinged at 4 upon a part of the fly-wheel. The point 4 is at a distance from the center of the fly-wheel equal to the length of the links $c$ and $e$. The small link $d$ is hinged at its other end 3 to a lever $f$, which can rotate about a center 9, also located in the prolongation of the centers 1 and 4 when in their medium position. The lever $f$ is the rectifier—that is to say, the part the position of which will determine the number of oscillations of the pendulum. In order to demonstrate the influence of its position, the pendulum must be shifted from its medium position by causing the spring $b$ to yield. Point 1 comes to 1'; 2, to 2'. This stroke 2 2' is approximately equal and parallel to 1 1'. The link $e$ comes to $e'$ and the point 4 to 4' by causing the beam or balance to form a certain angle. It will thus be seen that according to this arrangement the action will be as if the spring $b$ was acting directly at point 2 and with the same intensity as at 1, that the arm of the lever acting upon the balance or beam is the perpendicular from point O upon the trajectory 2 2'—that is to say, about equal to the distance $O^2$—and that the number of oscillations of the balance or beam will be proportionate to the length $O^2$, as previously set forth. By causing $f$ to rotate about its center 9 said distance $O^2$ is caused to vary, and consequently the number of oscillations within the unit of time is varied. It will further be observed that if the stroke 1 1' imparted to the spring is a constant, a result is obtained in the hereinafter-described apparatus, whatever the position of $f$, and consequently the number of oscillations of the pendulum, may be, the power induced being the tension of the spring corresponding to this stroke, which will accordingly remain the same for the several positions of $f$. By referring to Figs. 3, 4, and 7 all these parts bearing the same letters of reference will be found. Fig. 6 shows the indicating-dial in front of which moves the hand $y$, secured to the shaft $y'$ and connected with the rectifier $f$ through the medium of the sector $g$ and link $l$.

*Mechanism for resetting into synchronism.*—This device is shown in Figs. 4 to 7 and partly in schematic view, Fig. 3. The rectifier $f$ is connected through the link or rod $l$ to a sector $g$, pivotally connected at 12 with the part $m$, which is also hinged to the same center 9 as $f$. These four parts $f\ l\ g\ m$ form a parallelogram having a single fixed point 9. The part $m$ is constantly pushed by the spring 25, which thus causes the sector $g$ to press against a fixed part $j$, having the shape of a knife. The sector $g$ is provided with five teeth 8, with which the part $j$ engages to steady the segment $g$, and accordingly also the rectifier $f$. On the other hand, a lever $h$ of same length as the piece $m$ and the link $l$ rotates about a fixed point 7 and receives a reciprocating motion from the shaft whose number of turns it is desired to ascertain and carries the fork or V-shaped part $i$, which is hinged at 5 and rotates about the point. This part $i$ acts at the required moment upon the sector and in the appropriate direction in order to effect the displacement of the sector. In fact, at each oscillation of $h$ this fork meets the sector $g$ and this a little before $h$ has reached its mean position when starting from its lower position. Then if the fork before coming into contact with the sector has been shifted from its axial position at the right or at the left (and this through the means hereinafter described) one of the arms 9 or 10 of the fork will engage the toothed sector, imparting an oblique thrust to the latter and separating the same from the abutment $j$. The sector will then turn until the other arm will have come into contact at its turn and at the same time by carrying the rectifier $f$ with it by means of the link $l$. As soon as this double contact will have taken place the fork having two fulcrums upon the sector will form with the latter under the thrust of the spring almost a single piece and the lever $h$ continuing until the end of the stroke. This whole, fork and sector, will move parallely, forming the fourth side of a parallelogram, pivotally connected at 9 and 7 with the body of the apparatus, the two other sides being the equal parts $m$ and $h$. The same thing will take place on the return stroke as long as the sector does not rest upon its abutment and the fork is not freed. During the last part of this to-and-fro motion the following observations will be made: First, the joint 13 of the link $l$ upon the sector describing exactly the same arc of a circle as the points 5 and 12 and the link $l$ having the same length as $m$ and $h$ its other joint 14 upon the rectifier $f$ will remain entirely immovable, as well as the rectifier itself; second, during all this to-and-fro motion the fork is caused to remain in its axial position; third, the more the fork will have been shifted previous to the contact the greater will be the angle described by the sector and also by the rectifier.

Fig. 3 shows schematically the motion of the fork and of the sector and indicates the successive positions occupied by every one of these parts, viz: first, in full line when starting from the bottom the fork shifted to the right has come into contact with the sector by means of the arm 10 and pushes the latter to the left; second, in dotted line a little before the medium position, when the second arm of the fork has met the sector after the latter has turned, carrying with it the regulator; third, in dot-and-dash line at the end of the upper stroke the sector and the fork have run parallely, leaving the sector immovable. Now this is the way in which the fork has been shifted at the required moment in order to cause the rotary motion of the sector to take place. This fork carries an arm 11, Fig. 4, hinged at 6 to a link $n$, pivoted upon the joint 1 common to the spring of the pendulum and to the transmitting-link $c$. However, a weak spring $k$, wound around the joint 6 and acting in both directions, tends to keep constant the angle made by $n$ and 11, and consequently to bring the fork back into the central position. During the whole upper half-stroke the fork $i$, having been maintained as just seen, by the simultaneous resting of its two arms upon the sector, has been parallelly moved, and, consequently, the point 5 has made the same motion and at the same speed as 6, and the motion of $h$ has been transmitted to the pendulum. Therefore when the fork leaves the sector the points 1, 6, and 5 have the same speed. At this moment three things may happen:

First. The pendulum is in the required position to give the same number of oscillations as the lever $h$. The points 1 6 5 continue to run at the same speed and to make the same course, the motion of $h$ being exactly the same as that of the pendulum. They thus come at same time to the lower position and ascend again, the fork having a parallel transport motion. Its two arms attack at same time the sector, which consequently does not rotate.

Second. The number of oscillations of the pendulum is greater than that of the lever $h$. Therefore the point 1 and consequently 6 effect their motion quicker than 5. As they had the same speed when the fork was free, the point 6 makes a shorter oscillation than 5, ascends faster by opening the spring $k$, the arm 10 lifts the sector and accordingly causes it to rotate in the direction indicated by the arrow in Fig. 3—that is to say, brings the rectifier toward the smallest number of oscillations. Whereas the opening of the spring $k$ and the inclination of the fork are as much greater as the difference between the number of oscillations of the pendulum and the number of turns of the motor are greater, it follows that at every oscillation the rectifier will be brought back according to a quantity that diminishes until the equilibrium is reached, thereby insuring at same time the greatest speed of back-bringing and the greatest accuracy of position.

Third. If the pendulum makes a smaller number of oscillations, the points 1 and 6 continue their motion farther than 5, thereby closing the angle of $n$ and 11 and accordingly causing the arm 9 to act. Under these conditions the sector rotates in the direction reverse to that of the arrow in Fig. 3 and progressively induces the rectifier to cause a greater number of oscillations to be made. Considering exactly what happens in these second and third cases, it is to be observed that by means of calculations unnecessary to set forth here and also by direct experiment it is found that the differences caused by the fork under the influence of the balance or beam going fast or slow, varying at every moment, it is necessary to adjust the position of the abutment $j$, upon which the sector rests, at such a distance that the ends of the fork will meet together the sector a little before the lever $h$ has reached its medium position. This is what had been indicated hereinbefore.

*Third. Transmission.*—As already stated, the shaft whose number of turns it is desired to ascertain carries a mechanism which is able to impart a suitable vibratory motion to the movable diaphragm of an air-drum. By way of example, the arrangement of a transmitter has been shown in elevation, Fig. 8, and in plan view, Fig. 9, on which the following parts can be seen: $u$, frame carrying the mechanism; $p$, power-shaft; 15, eccentric imparting a reciprocating motion to the roller 16 of the lever $r$, pivoted at 21. The disk 17 acts upon the yielding diaphragm 18, of leather, india-rubber, &c., by driving the same into the drum. A spring 22 returns the diaphragm to its normal position and constantly presses the roller against the eccentric 15. A nozzle 19 receives the pipe 20, adapted to lead to the receiver the air which has been successively forced and sucked. The receiver, arranged within the case of the apparatus, Figs. 5 and 7, comprises the box $t$, in which the air comes from the transmitter through the nozzle 30, receiving the pipe leading to the transmitter. The air acts upon the diaphragm 23, secured to the plate 24, carried itself from two arms 26, pivoting about 27. A finger 29, secured upon one of the arms 26, directly operates the sliding lever 28, secured to the shaft 7. It is necessary that the oscillations always take place about the same medium position, which must coincide with that of the balance or beam, and it is further necessary to prevent this position from being modified in virtue of the increase or the accidental decrease of the volume of air contained within the main and in the drums. For this purpose a strong spring $s$, working by torsion in both directions, acts upon the arms 26 and tends to always bring the plate 24 back to the medium position. A slight leakage made for this purpose (or even those existing naturally) allow an excess of air to come in or out during that of the two periods which would be longer and brings it finally back to equality, so that the stroke will always take place about the same medium position which must correspond to that of the beam or balance.

The applications of this apparatus can be very numerous. Thus, for instance, this apparatus can be used for indicating at every moment the speed of a motor-car or of any other vehicle running on the road. This apparatus will also be used advantageously for indicating upon the bridge or in the cabin of a ship's captain the speed of his power-engines, to the engineer the speed of his engine, to the overseer by grouping in his study or in any other part, even far from the origin, the speeds of several important machines of his work, &c. In some special cases in which the indicator is arranged in a fixed point upon the machine the speed of which it is intended to ascertain a reciprocating part can be directly connected to the lever $h$, and accordingly the air transmission can be left aside.

Figure 11:
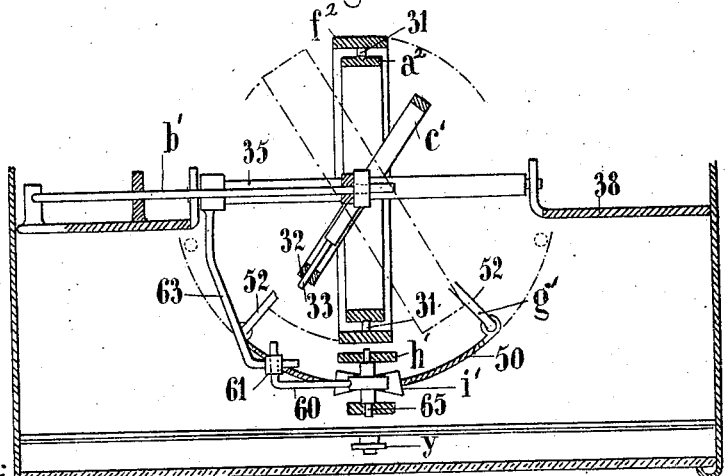
Figure 12:
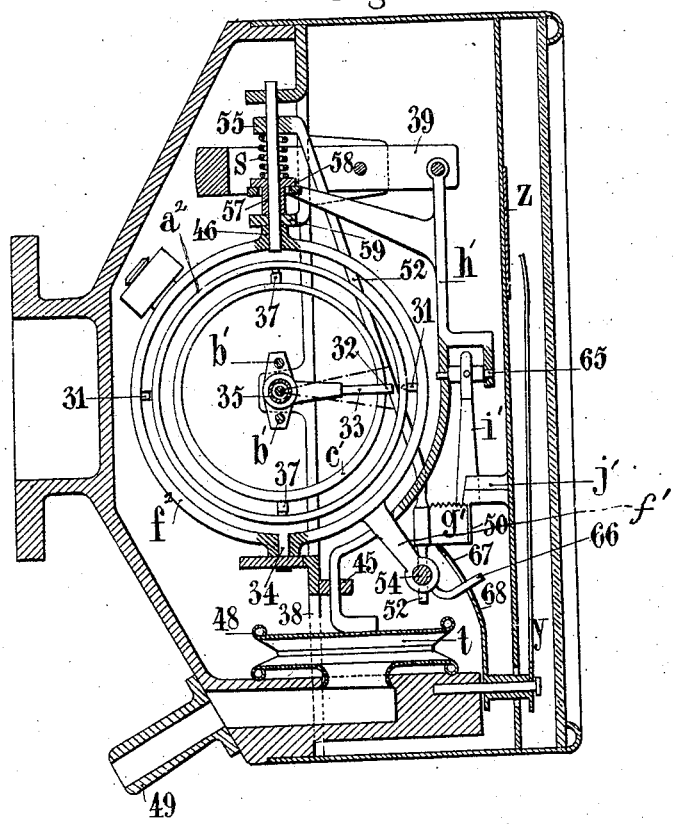

Figs. 10 to 12 show a modified form of the above-described arrangement with regard to the mechanical means employed for varying the lever-arm of spring $b$, acting upon the balance or beam $a^2$. In this modified form the balance or beam $a^2$ is provided with a heavy ring turning about one of its diameters through the pivots 31 in another ring $f^2$, used as a support and constituting the rectifier. This ring $f^2$ can also rotate about pivots 34 and 46, secured to the plate 38, forming a frame for the whole apparatus. These pivots 34 and 46 are located on a diameter which is perpendicular to the line of pivots 31. It is upon the angular position of this ring that depends the value of the acting lever-arm of spring $b'$, as hereinafter explained, and consequently the number of oscillations of the beam within the unit of time. The spring $b'$, allowing the oscillation to take place, is composed of the two flexible rods acting upon the hollow shaft 35, which transmits its motion to the balance or beam $a^2$ through the finger 33, secured to 35 and loosely engaging at 32 a light ring $c'$. This ring pivots about the beam $a^2$ by means of pivots 37, located upon a diameter perpendicular to the line of pivots 31. In the medium position of the finger 33 the pivots 37 and the fixed axis 34 46 are on a straight line, and if the ring $f^2$ is made to rotate about 34 46 the only effect produced will be to cause the distance between the finger 33 and the axis 31 31 to vary, and likewise the acting lever-arm of the spring upon the beam or balance. Therefore the number of oscillations imparted by the beam will also be varied, thereby enabling the resetting into synchronism. In order now to cause the rectifying-ring $f^2$ to rotate, a fork $i'$, similar to the one of the first arrangement, is used. This fork $i'$ pivots in 65 upon a piece $h'$, which is guided on the one part in the guides 45 of the plate 38 and on the other part on the double lever 39, which is also pivoted upon the plate 38. The reciprocating motion of the transmitter, Fig. 8, is imparted to that part $h'$, as previously set forth, by the movable wall 48 of the bellows $t$, which is connected to the transmitter by means of the nipple 49 and a suitable pipe. The rectifying-ring $f^2$ has a finger $f''$, supporting the cross-bar 54, in which slides at each of its ends 53 two rods 52, connected the one to the other by means of an arched strip 50, which is concentric with the axis 34 46. These rods 52 are connected at their upper part to form the socket or fitting 55, sliding over the shaft 46. The whole of the parts 52, 55, and 50 slides over the rectifier and is caused to turn with it. The strip 50 is provided with very fine teeth on its upper edge, so as to be seized by the fork $i'$, (in the same way as the toothed sector $f$ of the first arrangement.) It will be seen that these parts 52 55 50 acts exactly as the sector $g$. During the half back stroke of the part $h'$ the fork $i'$ liberates the toothed bar 50, which is fulcrumed on the fixed part $j'$. The pressing of the bar 50 against the part $j'$ is secured by a spring $s$, freely threaded over the fixed axis 46. This spring presses, on the one hand, against the socket 55, and, on the other hand, against another sleeve 57, freely sliding over the axis 46. During all the half fore stroke of $h'$—that is to say, when the fork $i'$ has liberated the toothed bar 50—the finger 58 of $h'$, pressing against the base of the sleeve 57, has pressed the spring $s$ against 55, and consequently applies the part $g'$ by means of its strip 50 upon the fixed stop $j'$. On the contrary, in the half fore stroke, when the fork has pushed forward the bar or strip 50 and the part $g'$, the spring is compressed by the sleeve 55 of $g'$, but the finger 58 has been moved away from the sleeve 57, which rests on the fixed support 59 of the axis 46. Accordingly the spring $s$ insures at same time the pressing of 50 against $j'$ or $i'$ alternately and also the return to the medium position of $h'$, (this spring corresponding at same time in operation to the two springs 25 and s of the first form.) The shifting of the fork i is obtained by means of its arm 60, pivoted through the small slide 61 to the arm 63, secured to the hollow shaft 35, which is connected, as hereinbefore specified, to the balance or beam $a^2$ and to the springs $b$. (See Figs. 10, 11, and 17.) To the fork $i'$ is imparted, on the one hand, the motion of shaft, the speed of which is to be determined, through the member $h'$, connected to the bellows $t$, and, on the other hand, the motion of the beam $a^2$ through the arm 63. According to the part 61 being fast or slow with respect to 65 the fork $i'$ will incline itself either to the right or to the left to be caused to act through one of its arms upon the toothed bar 50, which the rectifier $f^2$ carries with it in its angular displacement in the suitable direction to reëstablish the synchronism. The hand $y$ is operated by the finger 66, secured upon the rectifier $f^2$ and entering the groove 67 of a lever 68, connected to the hand $y$, which moves in front of the divisions of the dial $z$. (See Fig. 12.)

I claim—

1. A speed-indicator, comprising a standard balance or beam receiving during a portion of its oscillation an impulse determined by the shaft whose speed is to be determined and continuing freely its motion during the remaining portion of the oscillation, a spring for bringing the balance or beam to its medium position, a toothed sector adapted to assume a varying angular position and to which a reciprocating rectilinear motion is imparted by the shaft, the speed of which is to be determined, means for connecting the sector with the balance or beam, whereby its angular displacement will modify the amplitude of the oscillating motion of the balance or beam, a two-armed fork having varying angular position about a center to which the same rectilinear reciprocating motion is imparted by the shaft, the speed of which is to be determined, means whereby the two arms of the fork will be caused to engage the toothed sector without varying the angular position of the same when the motions of the beam and shaft are in synchronism, and when the motions of said parts are out of synchronism, the arms will be caused to successively engage the sector to produce an angular displacement of the same during the remaining portion of the movement of said fork, and a hand connected with the toothed sector and indicating the angular displacement of said sector, said displacement corresponding to the variations of speed of the said shaft, substantially as described.

2. A speed-indicator, comprising a beam or balance, adapted to be connected with a movable part, the speed of which is to be determined, to receive an impulse therefrom, a spring for returning the beam to normal position, a pivoted toothed sector, means whereby the sector will partake of the same movement as the beam or balance, a two-armed pawl for engaging the sector, means for causing the arms of the pawl to simultaneously or successively engage the sector, according to whether the beam and shaft are in synchronism or out of synchronism, and a hand carried by the sector and indicating on a dial, substantially as described.

3. A speed-indicator, comprising a beam or balance, adapted to be connected with a movable part, the speed of which is to be determined, to receive an impulse therefrom, a spring for returning the beam to normal position, a pivoted toothed sector, means whereby the sector will partake of the same movement as the beam, a stop for engaging the sector to steady the same, a two-armed pawl for engaging the teeth of the sector, means for causing the arms of the pawl to simultaneously or successively engage the sector, according to whether the beam and shaft are in synchronism, or out of synchronism, and a hand on the arbor of the sector and indicating on a dial, substantially as described.

4. In a speed-indicator, the combination with a shaft, the speed of which is to be determined, of a beam or balance adapted to be connected with the shaft to receive an impulse therefrom, a pivoted toothed sector, means whereby the sector will partake of the same movement as the beam, a two-armed pawl for engaging the sector simultaneously or successively according to whether the shaft and beam are in synchronism or out of synchronism, a bellows operated by the shaft, a second bellows connected with the first bellows, and means for operating the pawl from the last-named bellows, substantially as described.

The foregoing specification of my speed-indicator signed by me this 9th day of September, 1904.

LUC LÉON BASILE DENIS.

Witnesses:
GEORGE E. LIGHT,
MAURICE H. PIGNET.